United States Patent Office 2,785,028
Patented Mar. 12, 1957

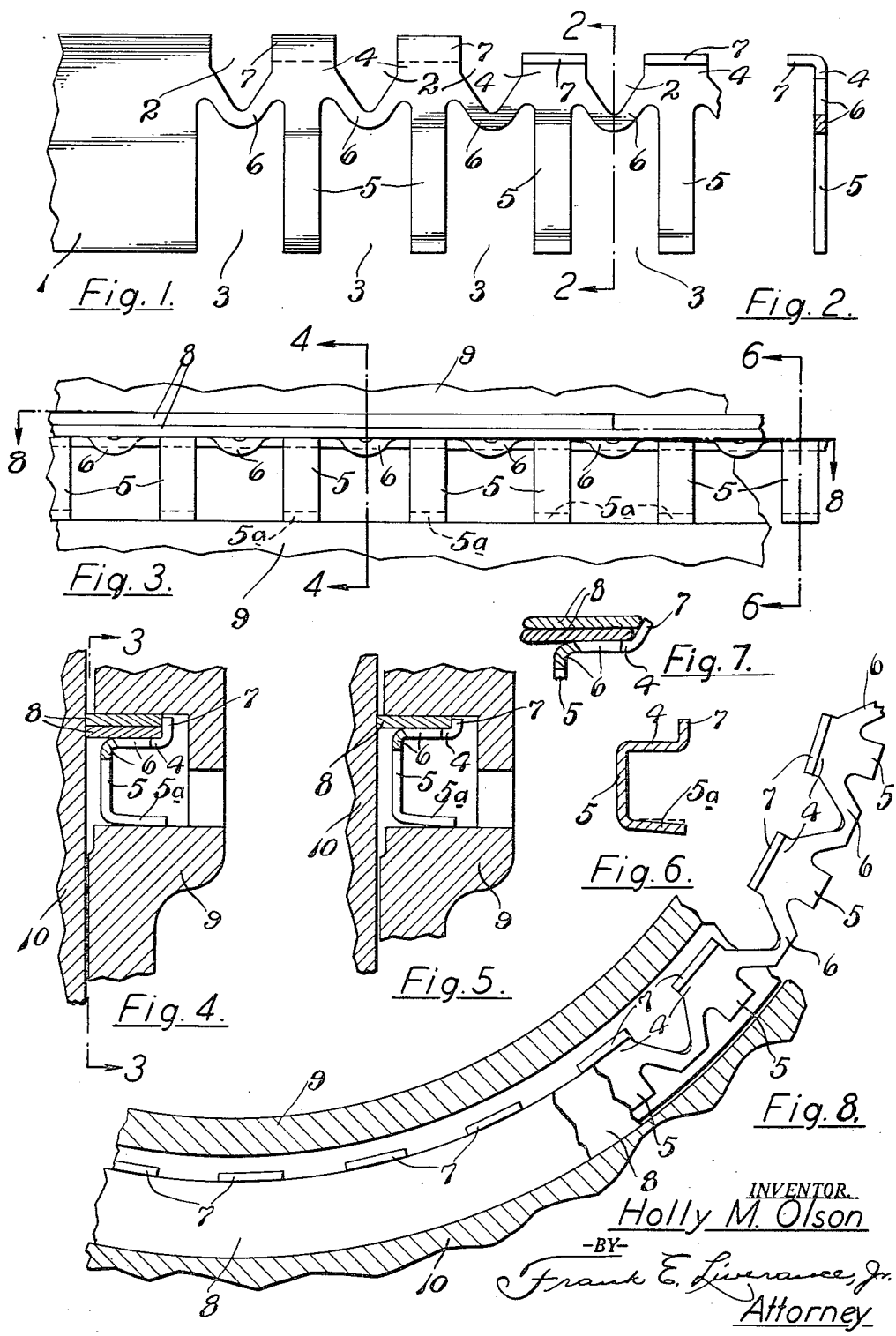

2,785,028
OIL CONTROL PISTON RING

Holly M. Olson, Muskegon, Mich., assignor to Sealed Power Corporation, Muskegon, Mich., a corporation of Michigan Application November 26, 1954, Serial No. 471,247

3 Claims. (Cl. 309—44)

The present invention relates to a novel, practical and simple piston ring structure, primarily adapted for use in the lower or oil salvaging ring groove of a piston in an internal combustion engine. The novel piston ring structure of my invention is directed to a better, more certain and complete salvaging of excess oil from the walls of a cylinder and its return through passages for the oil from the bottom of the oil groove to the interior of the piston.

To this end the substantially universal practice in conjunction with the thin metallic rail combination with a spacer between upper and lower rails is departed from. The rail or rails which are pressed with a desired unit pressure against the cylinder wall, with my invention, are located only at the upper side of the piston ring groove with no rail at the lower side thereof. A vitally important factor in connection with oil salvaging is increased, inasmuch as the effective width of the piston ring groove for passing of lubricating oil to the bottom of the groove and thence to the interior of the piston is increased, the flow of oil returning to the engine crankcase through the piston being substantially unobstructed, and the oil is returned more rapidly than heretofore.

One object of the present invention is to provide from thin ribbon metallic material, preferably steel, a structure which is blanked, formed and shaped therefrom, which is circumferentially compressible so as to press radially outward against a steel rail or rails at the upper side of the piston ring groove and exert uniform and equal radial pressure thereagainst to hold such rail or rails in full operative engagement against the cylinder walls.

A further object is to provide in such structure uniform and equally distributed axial pressure upwardly against the rail or rails used to obtain a more effective side sealing against the upper side of the piston ring groove. Such pressure enhances insurance against side leaks. Such pressure however is of a force such that the radial forces acting on the rail or rails to push them outwardly is not overcome, there being the outer edge pressure of the rail or rails against the cylinder bore at all times, together with a desirable axial pressure of a rail against the upper side of a piston ring groove to maintain and complete proper sealing thereof against such groove side.

A further object is to provide, in a simple structure, a uniform and upright support for maintaining the rail or rails used in a plane at right angles to the vertical inner cylinder wall, such support resting against the lower or bottom side of the oil groove of a piston and including relatively widely spaced supporting members whereby there is large and substantially unobstructed passage of excess lubricating oil, salvaged from the cylinder walls.

Also with my invention one oil scraping or salvaging rail may be used at the upper side of the ring groove, thereby increasing the open space below it in the ring groove for free ventilation of excess oil. In other installations, to provide for long life under harsh or drastic conditions, two rails, one over the other and lying one against the other are held under axial and radial pressures at the upper side of the oil ring groove. By a slight modification in structure, one of the two rails used, the lowermost one, initially may be made to extend outward farther than the rail above it, so that the first or under rail will first wear in to be followed by a wearing in of the second rail as wear on the first rail brings the outer edges of the two rails against the cylinder wall. This prolongs both effective sealing and the life usefulness of the piston ring structure.

The axial pressure against the upper side of the piston ring groove in which the novel piston ring of my invention is installed provides a braking action by such pressure which dampens and retards the tendency of a piston in a reciprocating internal combustion engine to tilt with respect to the longitudinal axis of the cylinder in which installed. This is of particular importance when, as has recently occurred and is now becoming more and more the practice, much shorter pistons are used than heretofore.

Also with my invention simplicity makes for economy in structure and in installation and assembly. The ring of my invention is also adapted for use by automatic loading devices for rapid installation thereof in the piston ring grooves and for economical installation of a piston loaded with such rings in the cylinders of internal combustion engines.

An understanding of the invention and of novel structure embodying the same may be had from the following description taken in connection with the accompanying drawing, in which, Fig. 1 is a plan view illustrating the first steps of providing the carrying, supporting and pressure member of the piston ring of my invention in stamping from a continuous length of thin ribbon stock and forming upwardly extending rail supporting ledges at spaced apart distances in the length of such piston ring member.

Fig. 2 is a transverse section substantially on the plane of line 2—2 of Fig. 1, looking in the direction indicated.

Fig. 3 is a fragmentary elevation of the completely assembled piston ring of my invention within the ring groove of a piston, the view being taken from the plane of line 3—3 of Fig. 4 in the direction indicated.

Fig. 4 is a vertical section substantially on the plane of line 4—4 of Fig. 3.

Fig. 5 is a like section differing from Fig. 4 in the use of one oil salvaging rail instead of two as in Fig. 4.

Fig. 6 is a transverse vertical section substantially on the plane of line 6—6 of Fig. 3, showing in full and dashed lines the straining of the parts which engage against the lower side of the piston ring groove and their deformation when installed in such groove.

Fig. 7 is a section similar to Fig. 4 showing a different positioning of the rails thereof, and Fig. 8 is a fragmentary horizontal section substantially on the plane of line 8—8 of Fig. 3 looking downwardly.

Like reference characters refer to like parts in the different figures of the drawing.

In the construction of the oil control piston ring of my invention, a support and expander for the upwardly located and carried rails which are used is made from a length of thin flat ribbon stock, as indicated at 1, there being progressively produced relatively shallow spaced slots 2 extending inwardly a distance from one edge of the stock and oppositely positioned relatively deep slots 3, which also are wider than the slots 2 from the opposite edge of the ribon 1. Between the successive slots 2 outward projections 4, and in line therewith, narrower and longer members 5 between the slots 3 are made, with integral connections 6 of generally V-shape as shown connecting the inner end portions of the sections 4.

Each of the sections 4 is bent to one side at its outer portion substantially at right angles to provide short tongues 7. In the two forms shown in Figs. 4 and 5 the tongues 7 may be of a dimension slightly less than the thickness of a single rail 8 as in Fig. 5, while in the form shown in Fig. 4 the dimension of tongue 7 is slightly less than the double thickness of the two rails 8 which are used.

The strip is bent and formed longitudinally into a generally U-shape. The sections 5 have their lower end portions bent inwardly at an angle somewhat in excess of a right angle, as shown in full lines in Fig. 6, providing terminal foot portions 5a. The sections 4 and the legs of the V-connection 6 lie in a plane substantially parallel to the parts 5a with the tongues 7 extending either vertically upward as shown in Figs. 4 and 5, or inclined inwardly to the vertical as in Fig. 7.

Such support and expander member is of the circumferentially compressible type, parted at one side to pass over the head of a piston. When placed in the lower oil groove of a piston 9 within a cylinder 10 the ends of such support and expander member come into abutting engagement and the entire member of circular form is circumferentially contracted to a smaller circumference thereby generating radial forces to push the rail 8 in Fig. 5, or the rails 8 in Fig. 4, outward to press against the cylinder wall 10. The sections 5a are sprung upwardly, for example, from the full line position in Fig. 6 to the dashed line indicated, thereby providing an upwardly directed force agains the rails to hold the uppermost one in Fig. 4, and the single rail in Fig. 5, with its upper surface snugly against the upper side of the piston ring groove. Such pressure is not sufficient to substantially interfere with the effect of outward radial pressure imparted against the inner edges of the rails 8 substantially uniformly around their entire inner edges.

In Fig. 7 where the tongues 7 are inclined upwardly and inwardly, using two rails 8 which lie one over the other upon the horizontal ledges provided by the upper sections 4 and the contractable ties 6, the lowermost rail at its outer edge extends outward slightly beyond the outer edge of the rail next above. Under such conditions when installed in a cylinder the outer edge of the lower rail 8 first engages the cylinder wall and becomes worn or seated thereagainst before the outer edge of the ring above it comes to the cylinder wall. Such distance that the outer edge of the lower rail extends beyond the outer edge of the upper rail is small and is shown exaggerated in Fig. 7.

With the structure described the rail or rails used, which are of thin metal substantially .020" to .025" thick, preferably of steel, and mounted only at the upper portion of the piston ring groove, on the downstroke of the piston scrape excess oil from the cylinder walls which flows inwardly into the piston ring groove and therefrom into the passages shown in Figs. 4 and 5 to the interior of the piston back to the engine crankcase. A wide open ventilation for full passage of the salvaged excess oil is provided.

The simple, practical, economically produced structure described attains the advantages and desirable effects previously set forth in full measure; easy installation, economical and practical production, exceptionally satisfactory removal of excess lubricating oil and a helpful maintenance of pistons against tendency to tilt in the cylinders in which installed.

The invention is defined in the appended claims and is to be considered comprehensive of all forms of structure coming within their scope.

I claim:

1. A parted circular piston ring comprising, a successive series of spaced horizontal ledges having integral, generally V-shaped ties between adjacent ledges, and a generally vertical lip extending upwardly at the inner edge of each ledge, and spaced elongated members integrally connected, one to each ledge, having upper legs in the same plane with and forming parts of the ledges to which connected, downwardly extending sections integral with said upper legs and located generally vertical, and lower legs extending generally horizontal inwardly from the lower ends of said sections, and a thin, parted circular rail over and resting upon said horizontal ledges and against said lips.

2. In a piston ring, a circumferentially compressible rail supporting member comprising, a successive series of spaced horizontal rail supporting ledges having each an upwardly extending lip at its inner edge, integral ties between adjacent ledges forming parts of the ledges, said ties being resistingly yieldable in the direction of the circumference of said member, a generally V-shaped integrally connected, one with each ledge and extending outwardly therefrom, each having generally horizontal upper and lower legs connected by a vertical web, the lower leg being adapted to seat against the lower side of a piston ring groove, and two parted, thin, circular rails located one over the other and resting on said ledges, having inner edges bearing against said lips, and said lips having an upward and inward inclination to the vertical, whereby the outer edge of the upper rail is inward of the outer edge of the lower rail.

3. A circular, circumferentially compressible piston ring element comprising, a successive series of spaced generally V-shaped sections, each having a horizontal ledge at the inner edge of each of which a lip extends upwardly, and an integral outer extension to each of said ledges, narrower than said ledges and lips, said extension being bent in a generally vertical downward direction for a preselected distance and terminating in an inwardly extending generally horizontal leg, said legs adapted to bear against the lower side of a piston ring groove, and integral ties between the adjacent edges of successive ledges, said ties having end portions in the same horizontal plane as said ledges, and intermediate portions extending in a downward direction, said ties being yieldingly resistant in the direction of the circumference of said ring elements.

References Cited in the file of this patent
UNITED STATES PATENTS

| | | |
|---|---|---|
| 345,767 | Buckley | July 20, 1886 |
| 2,635,022 | Shirk | Apr. 14, 1953 |
| 2,686,093 | Shirk | Aug. 10, 1954 |
| 2,695,825 | Estey | Nov. 30, 1954 |